United States Patent [19]
Burgess et al.

[11] Patent Number: 4,536,372
[45] Date of Patent: Aug. 20, 1985

[54] APPARATUS FOR BENEFICIATING COAL

[75] Inventors: Lester E. Burgess, Springfield; Karl M. Fox, Swarthmore; Phillip E. McGarry, Palmerton; David E. Herman, Jim Thorpe, all of Pa.

[73] Assignee: The Standard Oil Company, Cleveland, Ohio

[21] Appl. No.: 599,204

[22] Filed: Apr. 12, 1984

Related U.S. Application Data

[60] Continuation of Ser. No. 339,351, Jan. 15, 1982, abandoned, which is a division of Ser. No. 114,357, Jan. 22, 1980, Pat. No. 4,332,593.

[51] Int. Cl.[3] .......... B01J 8/00; C10L 1/32
[52] U.S. Cl. .......... 422/187; 44/51; 44/66; 44/68; 422/189; 422/224; 422/62
[58] Field of Search .......... 422/62, 294, 187, 189; 436/55; 209/164, 168, 170; 241/1, 21, 39; 162/55, 101; 44/51, 66, 68

[56] References Cited

U.S. PATENT DOCUMENTS

| | | |
|---|---|---|
| 1,390,230 | 9/1921 | Bates . |
| 2,397,859 | 4/1946 | Hersberger et al. . |
| 2,671,758 | 3/1954 | Vinograd et al. . |
| 2,684,338 | 7/1954 | McGowan et al. . |
| 3,244,615 | 4/1966 | Huntington . |
| 3,376,168 | 4/1968 | Horowitz . |

(List continued on next page.)

FOREIGN PATENT DOCUMENTS

| | | | |
|---|---|---|---|
| 121991 | 6/1948 | Sweden | 209/168 |
| 201264 | 11/1967 | U.S.S.R. | 209/168 |

OTHER PUBLICATIONS

Portfolio of Flow Sheets—Reprinted from Coal Age, Jan. 1978, pp. 66–83.
Coal Beneficiation, by Ash Agglomeration–Capes et al, 28th Canadian Chemical Engineering Conference, pp. 118–131–Halifax, N.S., Oct. 1978, NRCC No. 17141.
Effect of Chemical Pretreatment on the Desulfurization of Coal by Selective Oil Agglomeration, Edward C. Patterson, Sep. 1978, Energy and Mineral Resources Research Institute, Iowa State University–Ames, Iowa, IS–ICP–64.
Colloidal Fuels, Their Preparation and Properties, S. E. Sheppard, Journal of Industrial and Engineering Chemistry, Jan. 1921, vol. 13, No. I–pp. 37–47.
Rejection of Trace Metals from Coal During Beneficiation by Agglomeration, Capes et al., vol. 8, No. 1, Jan. 1974, pp. 35–38, Environmental Science and Technology.

(List continued on next page.)

*Primary Examiner*—Michael S. Marcus
*Attorney, Agent, or Firm*—Body, Vickers & Daniels

[57] ABSTRACT

Mine run coal is pulverized and the extended surfaces of the coal particles are rendered hydrophobic and oilophilic by a chemical bonding and graft polymerization reaction with a water unsoluble organic polymerizable monomer under peroxidation influence in a predominantly water reaction medium.

The mineral ash present in the coal and particularly the iron pyrites remains hydrophilic and is separated from the polymeric organic surface bonded coal product in a water washing step wherein the washed coal floats on and is recovered from the water phase and the ash is removed with the separated wash water in a critical wash step.

Excess water is removed from the beneficiated hydrophobic surface-altered coal product mechanically. The hydrophobic and oilophilic organic polymeric surface bonded coating about the coal particles is fortified by inclusion of additional unbound free fatty acids by further small additions thereof. The carboxylic acid groups present in the coal-oil product are thereafter converted to a metal soap.

The beneficiated coal product can be used "dry", or additional quantities of a liquid hydrocarbon fuel can be incorporated with the "dry" beneficiated coal product to produce a flowable fluid or liquid coal product having the rheological property of marked thixotropy. Introduction of this physically induced property into the liquid coal-oil-mixture prevents settling out of the heavier coal particles from the relatively ash-free fluid fuel composition under extended storage periods.

4 Claims, 4 Drawing Figures

U.S. PATENT DOCUMENTS

Figure 1A:
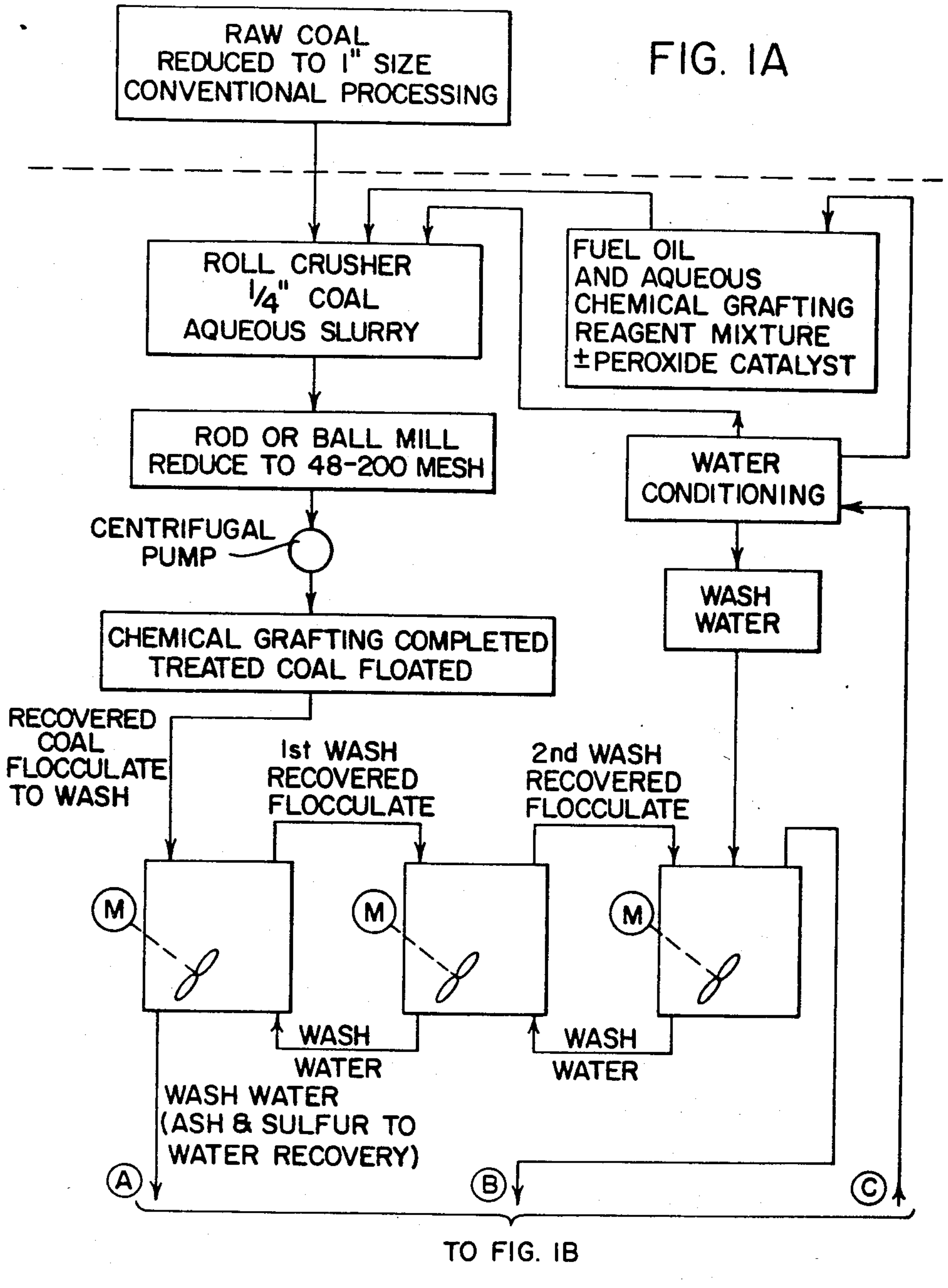

| | | | |
|---|---|---|---|
| 3,401,049 | 9/1968 | Horowitz . | |
| 3,446,353 | 5/1969 | Davis | 209/164 |
| 3,698,931 | 10/1972 | Horowitz . | |
| 3,703,481 | 11/1972 | Baker et al. . | |
| 3,732,084 | 5/1973 | Nixon et al. . | |
| 3,880,580 | 4/1975 | Horowitz . | |
| 3,920,792 | 11/1975 | Beekman | 424/319 |
| 4,033,852 | 7/1977 | Horowitz . | |
| 4,057,392 | 11/1977 | O'Donnell | 210/197 |
| 4,101,293 | 7/1978 | Krause et al. . | |
| 4,163,644 | 12/1978 | Bowers | 44/51 |
| 4,200,494 | 4/1980 | Welter et al. | 48/210 |
| 4,201,552 | 4/1980 | Rowell . | |
| 4,214,887 | 7/1980 | Gelder | 210/760 |
| 4,217,132 | 8/1980 | Burge et al. | 431/9 |
| 4,380,960 | 4/1983 | Dickinson | 110/347 |

OTHER PUBLICATIONS

Agglomeration in Coal Preparation, Capes et al., Proceedings of the Institute of Briquetting and Agglomeration, 12th Biennial Conference, vol. 12, Aug. 1971, pp. 11-5-11-17 (53-65 NRCC 12767).

Economic Assessment of the Application of Oil Agglomeration to Coal Preparation, Capes et al. (NRCC #14068) Jul. 1974, CIM Bulletin.

Pilot Plant Testing of the Spherical Agglomeration Process in Coal Preparation, Capes et al., Presented at the 16th Biennial Conference Institute for Briquetting and Agglomeration, San Diego, California (1979) (Jul.).

Cleaning of Eastern Bituminous Coals by Fine Grinding, Froth Flotation & High Gradient Magnetic Separation (A paper said to have been presented Sep. 1978 at Hollywood, Florida, by Freyberger, Keck, Spottiswood, Solem & Doane of Michigan Technological University, Houghton, Michigan 49931).

Feasibility Study of Molecular Grafting to Solubilize Coal (A report prepared for the United States Energy Research & Development Administration, by Lester Burgess & available from the National Technical Information Service, U.S. Dept. of Commerce, Springfield, Virginia 22161 at $8.00 paper).

APPARATUS FOR BENEFICIATING COAL

This is a continuation of application Ser. No. 339,351 Filed on Jan. 15, 1982, now abandoned which is in turn a divisional of application Ser. No. 114,357 filed Jan. 22, 1980, now U.S. Pat. No. 4,332,593.

This invention relates to the art of beneficiating coal to reduce the amount of ash and improve its transportation characteristics and more particularly to an improved process for beneficiating coal and the product produced thereby.

RELATED APPLICATION

This application is being filed concurrently with a companion application, (now U.S. Pat. No. 4,304,573) which claims a method of beneficiating coal which is improved by the invention claimed in this application. This commonly owned, companion application discloses the process of the present application for the purpose of providing the best mode known for practicing the invention of the companion application.

BACKGROUND OF INVENTION

A tremendous amount of work has been devoted over the years to procedures for beneficiating coal, i.e. reducing the ash and/or sulfur content of the coal. One of the processes for beneficiating coal has involved grinding the coal to a relatively fine powder and washing the powder with water to separate physically the ash from the coal. This process resulted in a beneficiated coal product having a high water content. Two basic disadvantages resulted. First, a substantial amount of energy was required in heating the coal to evaporate entrapped water. Also, to use the coal in a burner, the coal particles were generally suspended in a liquid fuel. Since the coal particles tended to settle in the fuel, the fuel and coal mixture had to be agitated at least directly before being introduced into a burner. There was no efficient manner for reducing the settleability of the fine coal particles in the liquid fuel for transportation purposes and/or for the actual burning operation. Indeed, the suspended coal often caused abrasive erosion of the burner using the combined coal and liquid fuel mixture. Consequently, a substantial amount of work has also been devoted to processes and procedures for suspending coal in fuel oil, such as the use of emulsifiers as described in U.S. Pat. No. 4,101,293.

The state of the art for providing a mixture of coal particles in a fuel oil mixture has involved pulverizing coal in a manner which entraps substantial water. Thermally extracting the water from the coal was required. The coal was generally mixed with a fuel oil for the purpose of providing a combined oil and coal mixture for use in burners. This combined lower cost coal with the ever increasingly more expensive fuel oil. Since it is advantageous to use a high percentage of coal, suspension of the coal is a primary problem. To assist in the suspension process, emulsifiers have been suggested. Combining these technologies still involves substantial process steps which include thermal extraction of water from the wetted coal particles.

As a separate development, it has been suggested that the pulverized coal can be subjected to a fuel oil and water mixture for cleaning ash fron the coal and extracting coal with the oil phase from the mixture. This separated coal is still settleable in the oil. Consequently, there has been no process for beneficiating coal to produce a coal product which is not settleable and does not require intermediate thermal extraction of unwanted volumes of water. Such thermal extraction is a cost addition hindering the use of beneficiated coal.

In a wholly different art there has developed a technology known as chemical grafting. In this process, an organic material can be grafted onto a substrate by the use of site initiators which create locations onto which the organic material can be chemically bonded to the substrate. Although this art is disclosed in certain patents, it has not been used in beneficiating coal. In U.S. Pat. No. 4,033,852 (Horowitz) chemical grafting is disclosed as a means for making a percentage of coal soluble in a solvent. This soluble coal in a solvent does not incorporate suspended coal particles and can not be used in high volume production of a burnable fuel since the amount of coal actually made soluble by the chemical grafting process is relatively small compared to the bulk of coal being used. This patent is mentioned in that it employs chemical grafting with a coal product; however, it is not being disclosed for the purpose of teaching the use of chemical grafting in a coal beneficiating process.

Chemical grafting, as disclosed in the Horowitz patent, is made to occur in the presence of minor amounts of additive chemicals which include a polymerizable unsaturated vinyl monomer constituting from 0.5 to 10% by weight of the coal to be treated and a free radical catalyst system in the range of from 0.001 0.010 wt. percent of the monomer. The free radical catalyst system consisted of an organic peroxide catalyst added to the reaction in an amount between 0.01 to 2.5 wt. percent of the monomer. A quantity of free radical initiator metal ions are present in said free radical catalyst system, usually noble metals. Monomers said to be useful for chemical grafting to the coal included vinyl oleate, vinyl laurate, vinyl stearate and other well established and well known monomeric, unsaturated natural or synthetic organic compounds.

The metal ion catalyst initiator disclosed in the Horowitz patent was silver originating from silver salts including silver nitrate, silver perchlorate and silver acetate. U.S. Pat. No. 3,376,168 (Horowitz) discloses that other metal ions, such as platinum, gold, nickel or copper can be used when chemically grafting the foregoing polymerizable monomers onto the backbone of preformed polymers, illustratively, cellophane and dinitrated nitrocellulose. This patent does not relate to increasing the solubility of coal.

As further background, for many years it has been know that finely divided coal particles could be agitated under specific control conditions with carefully selected liquid hydrocarbon fuels to cause preferential wetting of the coal surface with the water insoluble fuel fraction in an aqueous admixture. The process is known under the identification "Spherical Agglomeration." Summary reports in spherical agglomeration process development apparently show that the specific gravity of the hydrocarbon liquid, its origin and chemical and physical quality and the nature of the agitation are all inter-related. Operational variables appear to be critical and present substantial impediments to uniform operation. The coal particles used in this process are previously crushed to a fine powder, i.e. less than about 200 mesh, and often thermally dried. Also, the resulting product exhibits a common deficiency of short shelf life and difficulty in use with a burner.

As further background, it has been generally known as to equipment and methods for reducing mined coal to various particle sizes by crushing, grinding and pulverizing coal in either a dry state or when wetted by water. For background in such processes, Coal Age for January 1978, pages 66 through 83 has a portfolio of flow sheets of presently used processes.

As a summary of background for the present invention, it is apparent that efforts have been made to render coal more acceptable and economic as a source of energy. Systems have been suggested for beneficiating coal by crushing the coal into small sized particles and washing these particles for removal of ash and residue. Systems have been developed for mixing coal particles with fuel oil for use in burners, thereby taking advantage of the low cost and availability of coal. Each of these systems has disadvantages which have prevented its widespread use.

THE INVENTION

The present invention relates to a process for beneficiating coal and such a process for producing a usable coal and fuel oil mixture having a long shelf life and usable in burners.

In accordance with the present invention, a beneficiated coal product is provided which includes pulverized coal, the particles of which are coated with surface treating amounts of a polymerized organic coating sufficient to render said pulverized coal particles both hydrophobic and oilophilic. These particles are wetted by an oil phase comprising a water insoluble, liquid hydrocarbon fuel. The coal product is further characterized by the presence therein of a flow-modifying quantity of a water insoluble fatty acid soap. The invention also involves the process of making such a product.

In accordance with another aspect of the invention, the polymerized organic coating is a polymer of an unsaturated polymerizable monomer applied by chemical graft polymerization. The polymerized organic coating comprises a polymer of a water insoluble fatty acid of the structure RC=O—OH where R is an unsaturated moiety containing at least about 8 carbon atoms in an unsaturated hydrocarbon structure as the source of the fatty acid soap.

The process of this invention provides a beneficiated hydrophobic and oilophilic coal product of relatively low water content which can be further dehydrated to a remarkable degree without use of thermal energy. The ash content of the coal is reduced to very low levels and virtually all mineral sulfur compounds present are removed. The final coal product has enhanced BTU content, and can be burned as a solid or combined with fuel oil to produce a mixture of coal and fuel oil as a burnable fuel. One may use both alkali metal and alkaline earth metal ions to convert the oilophilic and hydrophobic liquid beneficiated coal of this invention to a thixotropic gel-like fuel having excellent dispersion stability with liquid hydrocarbons and fuel oils. The thixotropic flowable fuels are useful as sources of thermal energy. The dry coal product can, if given elected metal treatment, be readily redispersed in aqueous systems which will allow pumping through pipelines of a fluid aqueous coal slurry.

In brief summary, the foregoing can be accomplished either during particle size reduction of the coal from mine run, refuse piles, coal processing fines, etc., while the coal is suspended in or wetted by water sufficiently to permit fluid flow.

In one aspect of the invention, the coal is subjected to a chemical grafting procedure in the presence of from about 0.1% to about 10% by weight of the coal component of a liquid water insoluble hydrocarbon fuel fraction which serves along with water as a carrier for the chemical grafting polymerization reactants which chemically react on the surface of the coal to cause the original water wetted coal surfaces to become chemically altered by covalent bonding of polymerizable monomers to the surfaces of the coal being processed. The coal surfaces become preferentially wetted by all qualities of water soluble hydrocarbon fuels from aliphatic to aromatic quality and from heavy fuel oils to kerosene without known qualification.

The chemical grafting polymerization reactants broadly useful for the purposes of this invention include polymerizable organic monomers having at least one unsaturated group which includes such monomers that are liquid at room temperatures. Illustratively the list includes styrene, dicyclopentadiene and other monomers as are shown in the prior art.

However, we have found advantages in use of water insoluble organic acids having the general structure RC=O—OH where for grafting R is more than about 8 carbon atoms in size and is unsaturated. Excellent results have been obtained from tall oil and unsaturated vegetable seed oil fatty acids generally. The carboxyl moiety of the group is not essential at this point, but is considered an advance in the art, as will be shown more fully below.

A free radical polymerization promoting catalyst, heretofore essentially an organic peroxide, is no longer so limited and both organic and inorganic peroxides are used in the catalyst additive which is acted upon at the selected part of the processing by a free radical catalyst initiator, which comprises an active metal ion, usually copper. Combinations of metal ions are also useful. We have found hydrogen peroxide is useful in our aqueous system.

It has been found that all of the above additives, except preferably withholding the free radical polymerization promoting catalyst, may be present from the initial stages of pulverization where the coal particles are reduced to the particle size to form from about 48 mesh to 200 mesh or finer, or more desirably a particle size range of from about 0.1–79 microns in diameter. In the preferred practice, the free radical polymerization catalyst is added toward, or at the end of or after, the final pulverization of the coal. It can be present, however, and added at any time in the coal attrition cycle (reduction to 48 to 200 mesh) along with the remainder of the chemical grafting additives described above.

Chemical grafting takes place on completion of addition of the peroxide catalyst (organic peroxide, oxygen, air, hydrogen peroxide) to the described water insoluble unsaturated organic acid and the metal initiator of the free radical forming catalyst. (Total replacement of peroxide with oxygen treatment has not been fully established, but presently appears technically feasible.) Grafting of an unsaturated RC=O—OH molecule to the extended surface areas of the coal particles takes place in the aqueous slurry containing the chemical grafting polymerization reactants (including water and fuel oil as carriers therefor). Immediately after recovery of the aqueous slurry of the coal, now rendered strongly hydrophobic by grafting of the RC=O—OH molecule to the coal surface, the hydrophobic, finely divided particles flocculate and float on the surface of the water phase. Upon water wetting and settling, the larger percentage of ash present in the original coal remain hydrophilic in surface character, both settles into and tends to remain dispersed in the water and can be pumped off below the flocculated coal for further separation and disposal of ash and recovery and recycle of the water.

Lime can be used, if desired, to aid ash removal from the water phase. It has been established as preferable and advantageous, however, to withhold addition of all of the chemical grafting components until after reduction of the particle size of the coal in its final milling operation. In practice, the peroxide free radical polymerization catalyst is more efficiently utilized if withheld until all the other additive components (metal ion and polymerizable monomer) have been allowed to obtain a maximum degree of dispersion in the final, finely pulverized water wetted coal slurry.

As the chemical grafting reaction is completed by the peroxide treatment, the now hydrophobic and oilophilic beneficiated coal particles flocculate and float to the surface of the liquid mass. The ash, still remaining hydrophilic, tends to settle and is removed in the water phase.

The recovered flocculated hydrophobic coal is redispersed as a slurry in fresh wash water with good agitation. Initially, it was found successful to provide needed dispersion of the hydrophobic coal particles in the water wash steps by use of recirculating high shear centrifugal pumps. If the coal-oil-water flocculates can be more effectively broken up, however, by higher shear means, water held in the interstices of the flocculated coal particles which hold an additional quantity of ash, is brought into more effective wash water contact with the ash and more of the total ash content is removed from the recovered hydrophobic coal particle conglomerate.

Increased efficiency of ash removal during the wash step has been obtained by resorting to equipment producing high liquid velocities and high gear rates. This has been accomplished more efficiently by ejecting the coal-oil-water flocculates in fresh wash water under atomizing pressure through a spray nozzle, thus forming minute droplets, momentarily in the air, but directed with force into and onto the surface of fresh wash water mass. Some air is thereby incorporated into the system. This improvement in the ash removal step forms a part of the present invention.

Following the plural water-washing-high shear redispersion of the coal floccules and the further removal of ash thereby released to the water phase, in our preferred practice the coal is again subjected to a second graft polymerization step using the chemical grafting reagent mixture including the unsaturated $RC{=}^{O}{-}OH$ acids (tall oil fatty acids), hydrogen peroxide, water soluble copper salt, fuel oil and water as used priorly in the process. However, the second graft polymerization step, while preferred, is not absolutely essential. The treated coal, beneficiated to provide a dry coal product containing a small water content, a small amount of fuel oil and an improved BTU content can thereafter be recovered for "dry" fuel use.

A non-settling, fluid, pumpable, storable liquid coal-oil mixture (C.O.M.) may be prepared starting at this point. One need not essentially perform the second graft polymerization step. However, it is a preferred mode of practice of the invention. One may elect to merely incorporate a further small but effective amount of a free fatty acid ($RC{=}^{O}{-}OH$ acid) where the R group may or may not be unsaturated at the same point in time as in the preferred practice referred to immediately above.

The recovered washed hydrophobic coal, freed of a major amount of the ash originally present, is further dehydrated to very low water levels solely by mechanical means, illustrated by centrifuging, pressure or vacuum filtration, etc., thus avoiding the essential use of thermal energy to remove residual water requiring costly heating of the entire coal mass. As the treated coal is now hydrophobic and oilophilic or oil wetted, water is more readily removed.

At this point the treated coal is electively ready to prepare a fluid coal-oil-mixture (C.O.M.). Additional quantities of fuel oils, as demanded, are blended with the treated "dry" coal at any desired ratio. Preferred ratio is about 1:1 by weight.

Two avenues of further treatment remain open. If $RC{=}^{O}{-}OH$ is used in the chemical grafting step to render the surface of the coal particles oilophilic and hydrophobic, the grafted acid group, as well as the added fatty acid group, can be further reacted through their active, acidic hydrogen atom with an alkali or alkaline earth metal or a variety of selected metal ions. Through selection of metal ions, the "drop point" of the final liquified clean-oil-mixture (C.O.M.) thixotropic liquid fuel products can be controlled.

If one wishes to slurry the recovered coal in water to produce a stable dispersion and suspension, as might be required for pumping through pipelines for extended distances, the acidic hydrogen can be replaced with an alkali metal ion, illustratively sodium.

However, it is more likely that a fluid suspended fine particle solid coal product extended with a fuel oil hydrocarbon will find the greatest commercial demand. In this case the metal is selected for the desirable "drop point" of the liquified coal-oil fuel product. Alkaline earth metal ions are quite useful for this purpose.

It has been discovered that conversion of the acidic hydrogen ion, traceable to the hydrogen of the $RC{=}^{O}{-}OH$ additions (and in the chemical grafting in some instances) to a metal ion; illustratively sodium, potassium, calcium, (the alkali and alkaline earth metals) surrounding the surfaces of the beneficiated coal particles allows ready dispersion of the coal in fuel oils of most all grades to produce a gel or structure which retards settling almost indefinitely. The "drop point" (the temperature at which the gel structure allows free flow of the liquid coal-oil-fuel) appears to be controllable by the metal ion selection. Other metal ions may also be useful alone or in admixture to control the "drop point".

Coal extended liquid fuel oil products of this invention have unique properties. Among them is the quality of thixotropy which gives structure of gel-like viscosity increase to the fuel oil extended coal. When the liquid is at a state of rest, or when it is below its "drop point", the gel structure is unbroken. However, upon stirring or agitation as by a circulating pump or agitation or heating above the "drop point", the structure in the product is broken down, and the liquid flows normally but is non-Newtonian in nature. The "drop point" temperature has also been influenced by the selection of the metal ion.

Thus, the versatility of the pulverized coal is increased, the energy content is increased, undesirable ash is removed and the potential for a widely expanded market for coal as a fluid fuel provide means for further conservation of petroleum.

It is anticipated that the fluidized version where fuel oils of various grades are the carriers will become of major importance as a liquified coal-oil product as herein described.

This invention chemically alters the surface of the coal particles so that they both repel water and invite union with the fluidizing liquid fuel in which the coal particles are dispersed. This chemical surface reaction is carried out principally in water. In this process is a marked improvement in product quality and yield to subject the coal to chemical surface treatment a plurality of times which provides many practical economics and unexpected technical advantages.

Reduction of ash content (the principal source of mineral sulfur in coal) is extremely important in obtaining an acceptable coal. The ash content of coal is present in extremely fine states of subdivision in the coal. The surface treatment of the coal provides a strongly oil-loving quality, however, the freely divided ash remains water-loving or hydrophilic to facilitate selective separation of coal and ash.

The water-wash step of the process is particularly important. The more complete separation of the ash in the water phase and more complete recovery of the beneficiated coal in the water-rejected "oil" phase can be achieved by attention to the quality of the water in the water phase and by introduction of novel process limitations in the wash steps whereby wash water and recovered floating coal from the water phase is intimately admixed under the high shear developed in a mixing hose nozzle under pressures above atmospheric, jetting the usually antagonistic hydrophobic coal particles in repulsed, but intimate, wash-water contact through one or more orifices of the high shear nozzle inducing air inclusion both in the passage through the nozzle as well as upon impingement upon and into the air-water interface of the wash water bath. Through the foregoing process modifications, ash can be more completely removed and the coal particles more completely recovered than had heretofore been thought possible. This improvement in the washing step is an aspect of the present invention.

BRIEF DESCRIPTION OF THE FLOW SHEETS

Figure 1B:
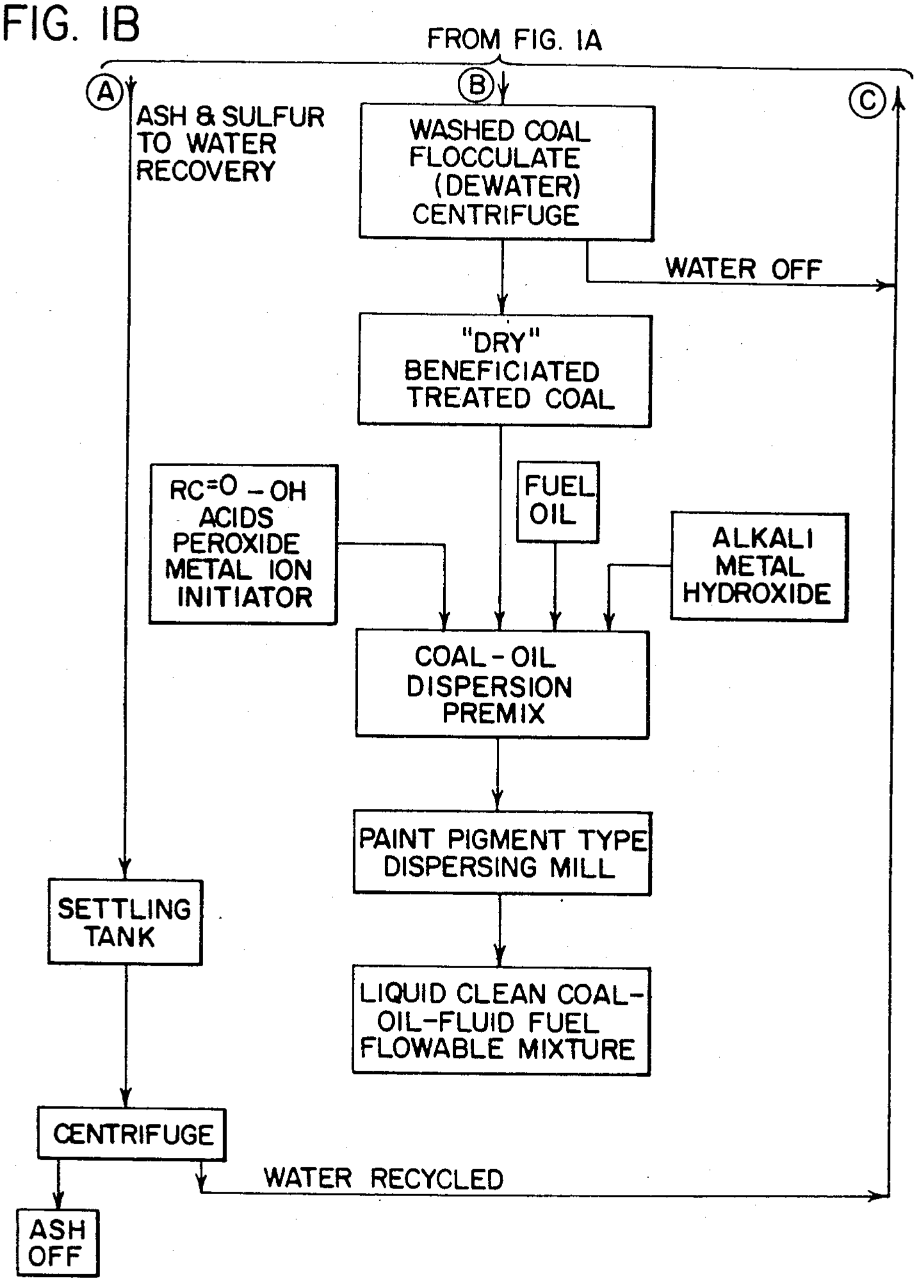

FIGS. 1A and 1B taken together provide illustration and reference for a more complete description of the process in one embodiment.

Figure 2A:
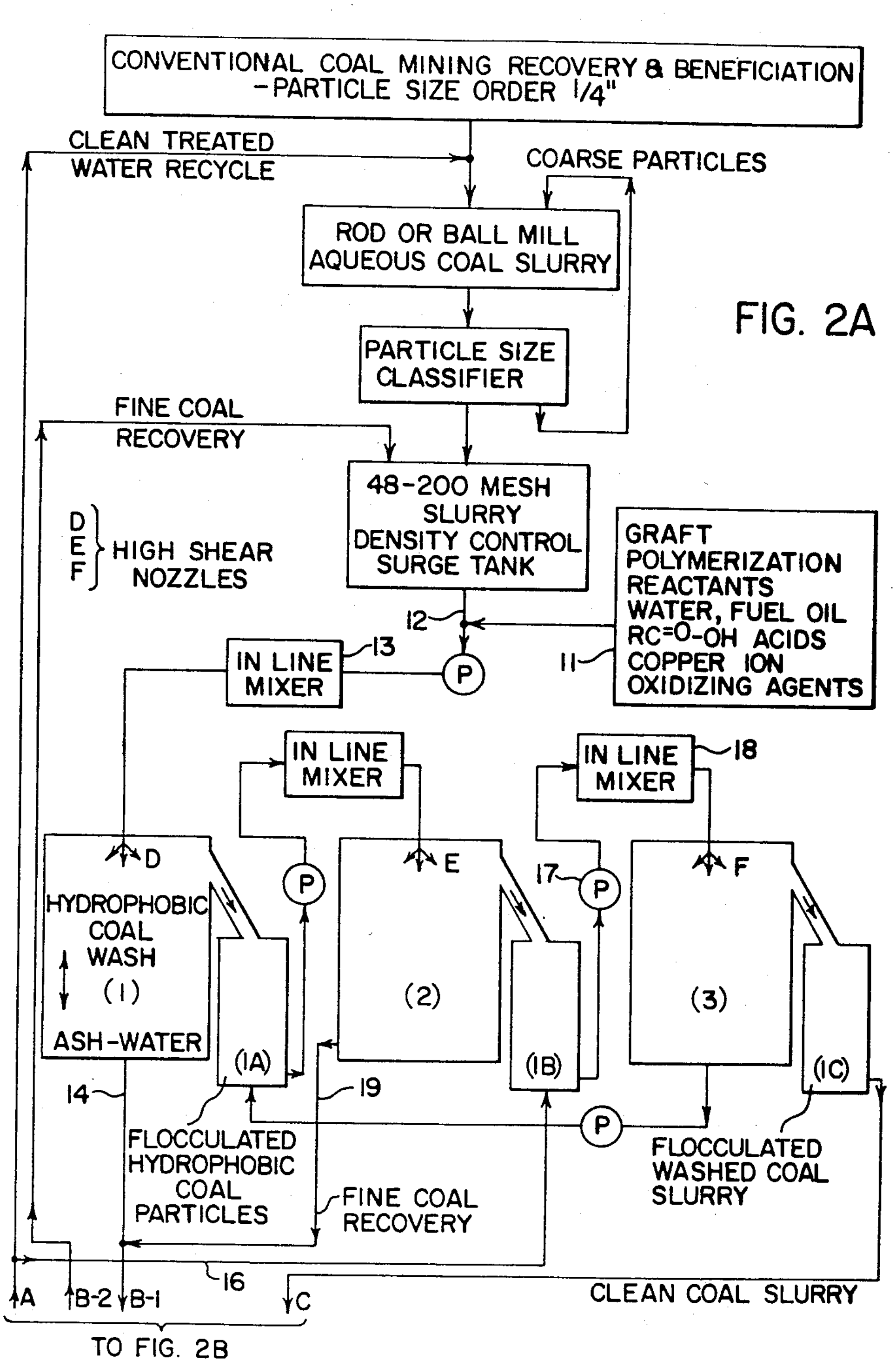
Figure 2B:
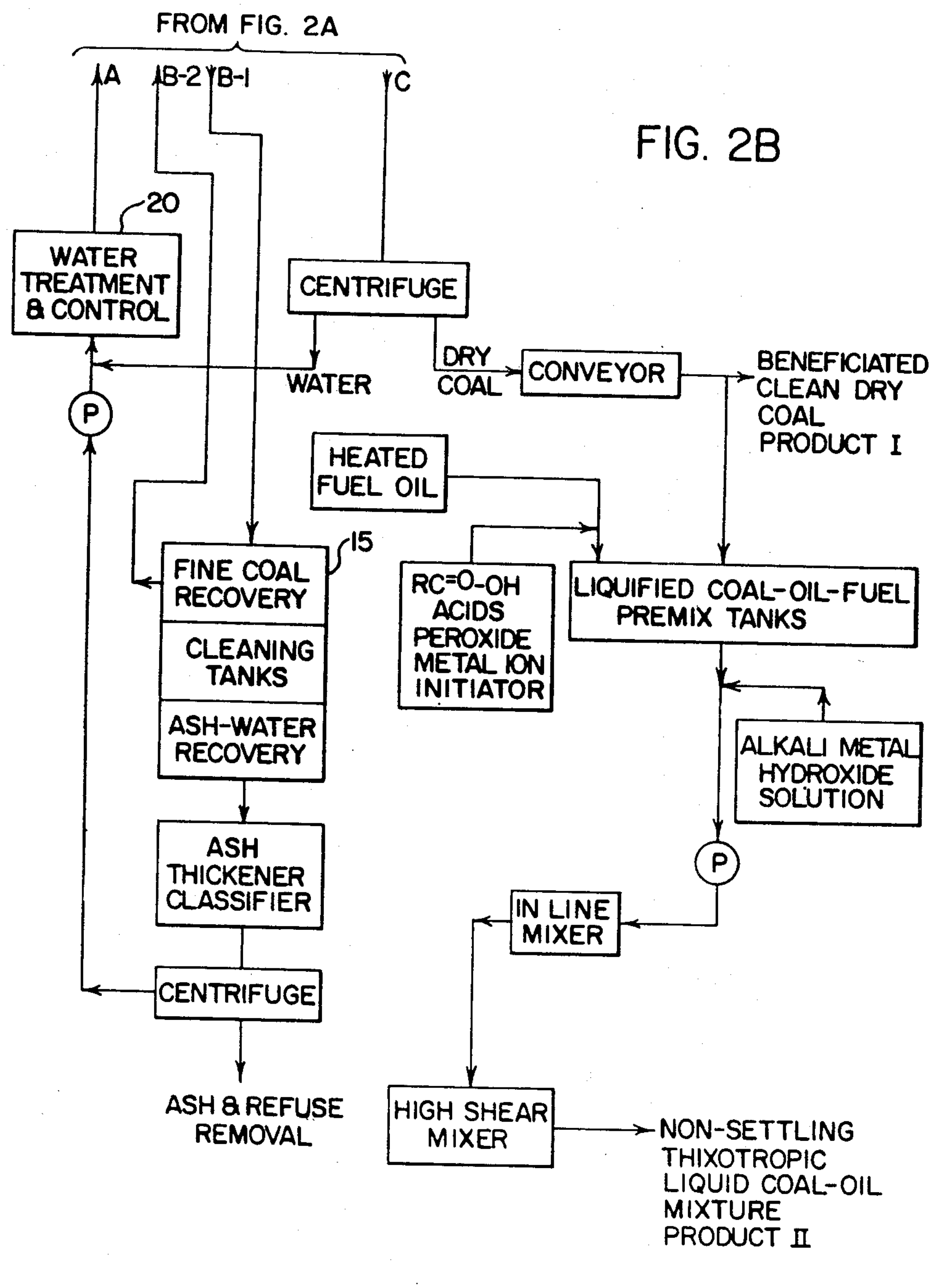

FIGS. 2A and 2B taken together provide illustration and reference for a more complete description of the best mode now known by the inventors to practice the process.

EMBODIMENTS AND EXAMPLES

Referring more specifically to FIGS. 1A and 1B, raw coal from the mine is reduced by conventional mine operations to relatively uniform top size particles as indicated. Recovered fines from mine ponds or tailings can be equally used. If the larger 1"± size is used as a starting point a hydro roll crusher reduces the coal to about a $\frac{1}{4}$" particle size coarse aqueous slurry.

To this aqueous coal slurry, after it has been further reduced below $\frac{1}{4}$" in particle size, is added a composite chemical grafting reagent mixture which may, or may not, contain the free radical polymerization catalyst. Priorly an organic peroxide was used as the free radical catalyst. However, it has been found that hydrogen peroxide $H_2O_2$ is satisfactory and less costly. The other essential components of the chemical grafting step mixture are a polymerizable water insoluble monomer, preferably an RC=O—OH acid where R is more than about 8 carbon atoms and unsaturated; a reactive metal ion site catalyst initiator salt, and as part of the liquid carrier a minor amount of a selected fuel oil.

The course coal slurry, in the presence of the chemical grafting reagent mixture, is further reduced to have about 48 to 200 or better mesh. The peroxide catalyst is preferably (more efficient use) added as the final component of the chemical grafting reagent mixture at this point in the fine milling stage, if not added earlier.

The coal becomes extremely hydrophobic as the chemical grafting step is completed at this point, flocculates and separates from the aqueous phase and the remainder of the mill charge when milling ceases. Considerable ash separates out in the water phase at this point. The floating flocculated hydrophobic coal is recovered (a screen may be advantageously used for separation and recovery of the flocculated coal) and is passed through a plurality of wash steps wherein good agitation with high speed mixers of the hydrophobic coal-water wash dispersion causes release of additional ash to the water phase which ash is removed in the water phase. The water-wetted ash suspension is recovered by further settling tanks and centrifuge and is sent to waste. The process water is recycled and reused. Additional ash and sulfur is removed from the grafted coal-oil conglomerate by the series of counter-current water-wash steps.

The chemically grafted pulverized coal (with most of the ash originally present in the raw coal removed) is dewatered to a very low water level by centrifuging. Prior art beneficiation processing water contents of recovered coal are of the order of 50-60% water content and are poorly wetted by oil. In the present process before chemical grafting the water content is of the order of 22 to 28%. After graft polymerization of the coal and total beneficiation, the water content of the grafted washed product is of the order of 6-12% water content by weight.

The recovered "dry" beneficiation treated coal mass can be used directly as a "dry coal" product as a fuel without further addition of fuel oil. Preferably a sufficient quantity of fuel oil is further incorporated with the metal treated chemically grafted product to produce a coal-oil-liquid fuel mixture.

The mechanically de-watered coal aggregate ("dry" beneficiated treated coal) is transferred to coal-oil dispersion premixer and additional RC=O—OH acid is added. It is usual that this added acid is the same as the unsaturated acid used in the chemical grafting step. However, the acid need not have an unsaturated R group at this point. Economics of operation may be possible with the use of saturated RC=O—OH acids including as illustrative stearic acid and the series of both crude and refined napthenic acids recovered from refining of crude oils, etc. Sufficient water soluble alkali hydroxide metal is incorporated to neutralize all the free fatty acid hydrogen on and about the hydrophobic coal particles.

Fuel dispersion can be carried on, either continuously or batch, in paint grinding equipment where heavy small grinding media are used to shear the dispersion into a non-settling fuel product of thixotropic nature by further metal ion source addition, such as calcium hydroxide to form an alkaline earth metal salt or soap. Other metal soaps are also useful as indicated herein.

Referring more specifically to FIGS. 2A and 2B of the drawings. FIGS. 2A and 2B in conjunction with the following exposition will expand and illustrate the best mode presently known for reducing the invention to practice.

By conventional coal mining recovery and beneficiation processes with run of the mine coal or on the reworking of mine tailings or solids from coal recovery ponds, this process begins with conventionally obtained particulate coal reduced to about ¼ in size, more or less. Of all coal ground or crushed commercially, 50–60% becomes too fine for commercial use. The "waste" fine coal sources are excellent sources of raw coal stock for the subsequent milling step to follow.

The coal, as described, is introduced into a ball or rod mill, or other pulverizing and size reduction equipment. The water is preferably treated with sodium pyrophosphate and/or other organic and inorganic water treating chemical and the classes of which are well known, enhancing the effectiveness of the water. A primary function of the additive materials is to serve as dispersant. The inorganic water treating chemicals may also have in conjunction therewith small percentages of organic surfactants (such as Triton X-100) of anionic, cationic or non-ionic class. The water may also be passed through an ion exchanger.

A pulverized coal-water slurry of fluid consistency adapted to the requirements of the milling equipment selected is developed in the mill and the average particle size to pass through a 48 mesh and there can be retained some fair percentage of coal particles on a 200 mesh sieve.

So far as is known, there is no objection if a large percentage of the product of the wet milling produced is smaller than 200 mesh, but it is preferred if no large percentage is above the 48 mesh upper limit of size range.

The aqueous slurry leaving the rod mill is put through a classifier and all particles more than about 48 mesh are returned for further size reduction.

The material leaving the classifier passes to a surge tank where the density of the coal slurry is controlled to a standard. Fine coal recovered from the later wash water is returned for reprocessing. The principal graft polymerization reaction takes place subsequent to the control in the surge tank and prior to the first of three water-wash steps where the chemical grafting reactants are added.

An aqueous chemical grafting reagent mixture when complete and useful for the initial graft initiating purposes herein contains about ½ lbs. tall oil fatty acids, 100 lbs. liquid water insoluble hydrocarbon (usually a selected grade of fuel oil), 1 lb. of, illustratively, copper nitrate. (Other metal ions are also known to be useful to provide metal ion initiator sites. Cost in general rules out their practical use.) A last essential element, the free radical processing peroxide catalyst which may be any of the known organic peroxides or inorganic peroxides ($H_2O_2$) added directly or produced, in situ, with air or oxygen, but which is here preferentially hydrogen peroxide constitutes about 1⅝ lbs. of $H_2O_2$ in solution of 30% $H_2O_2$-70% water strength. The amount of chemical grafting catalyst polymerization mixture is exemplary of that required for treating about 2000 lbs. of the described, high pulverized coal product (by dry weight) in aqueous slurry.

In practice it has been found advantageous but not essential, to withhold the peroxide or free radical polymerization catalyst addition until just after the slurry is pumped from the surge tank.

Chemical grafting takes place very rapidly as the finely ground aqueous coal slurry leaves the surge tank and is intimately admixed with chemical grafting or polymerization mixture described above. This mixture of reactants 11 is pumped into the coal slurry discharge line 12, and is passed through an in-line mixer 13 under some pressure. Reaction takes place rapidly. The coal surfaces now treated become more strongly oilophilic and hydrophobic than heretofore and are no longer wetted by the aqueous phase.

The stream of treated hydrophobic coal, wetted with polymer and fuel oil under pressure along with the accompanying water phase, is fed through a high shear nozzle D where the velocity of the stream and the shearing forces break up the coal flocculant-wash-water slurry into fine droplets which pass through an air interface within the wash tank (1) and impinge downwardly upon and forcefully jetted into the mass of the continuous water phase collected in the first wash tank (1).

The high shearing forces created in nozzle D and as the dispersed particles forcefully enter the surface of the water phase break up the coal-oil-water flocs thereby water-wetting and releasing ash from the interstices between the coal flocs and break up the coal flocs so that exposed ash surfaces so introduced to the water phase, are separated from the coal particles and migrate into the mass water phase. The finely divided coal particles whose surfaces are surrounded by polymer and fuel oil also now contain air sorbed in the atmoized particles delivered from and through the shear effects of the nozzle. The combined effects on the treated oil, including the chemical grafting and fuel oil plus sorbed air, cause the flocculated coal to decrease in apparent density and to float on the surface of the water, separating the flocculated coal upwardly from the major water mass in wash tank (1) and then to overflow into the side collector (1A).

The still hydrophilic ash remains in the bulk water phase, tends to settle downward in wash tank (1) by gravity, and is withdrawn in an ash-water stream 14 from the base of the vessel. Some small amount of fine coal which may not be separated completely is transferred with the water phase (withdrawn ash-water component) to a fine coal recovery station 15 (See FIG. 2B).

It is of interest to review the various physical phenomena that occur in each wash step which enhances the efficiency of the operation.

In passing the hydrophobic polymer-oil surfaced coal-in-water slurry through the nozzle D, unwanted mineral ash containing a larger percentage of objectionable mineral sulfur and inert non-combustibles in intimately interfaced with water. This ash is preferentially water-wetted and tends to enter the water phase and stay wetted thereby. Passage of the finely divided aqueous slurry of coal floc through the nozzle and through air space and surface impingement, all under high shearing stress, causes air to be sorbed by the system and be occluded in the coal floc.

The coal floc itself is of lesser density than coal itself due to the chemically polymerized organic layer on its surface which is less dense than water, the fuel oil present which is sorbed on the oilophilic-hydrophobic coal particle and sorbed air present in the floc. The coal floc thereby assumes a density less than water and as it repels water by its increased hydrophobic quality quickly floats to the surface of the water present. The ash, on the other hand, remains hydrophilic and is, in effect, repelled by the treated coal surfaces, preferentially into the water phase. The density of the ash is greater than water and tends to settle out downwardly through the water mass. While we do not wish to be bound by theory, the foregoing factors are believed explanatory of the excellent and remakably complete separation of the high sulfur containing hydrophilic ash from the graft polymerized hydrophobic coal and improved coal recovery. Reducing sulfur content overcomes most of the consistent objections to coal as a fuel.

By the foregoing technique not only is the ash removed from the treated coal product improved in percentage, but the entrapped air and the more hydrophobic and oilophilic coal surfaces provide a marked increase in efficiency of total beneficiated treated coal recovered.

The wash process of the first wash is repeated in essence through a counter-current wash system, the coal progressing to a cleaner state through sequential overflow and recovery in wash tanks (1), (2), and (3), while clean wash water becomes progressively loaded with water soluble and water wetted solid impurities extracted in the wash water as the cleaned water is recycled from water recycle line A into the second washed floc recovery tank (1B) through recycle water line 16. Fresh or recycled treated wash water into tank (1B) is dispersed into the floc and the resultant slurry removed by pump 17 from its base with the second washed overflow floc from tank (1B) through an in-line mixer 18 into wash tank (3) through shear nozzle means F.

The separated ash-water wash water from wash tank (3) is removed from the base of wash tank (3) and is pumped counter-currently into the first washed floc tank (1A) where it is, in turn, pumped with the overflow floc collected in tank (1A) through an in-line mixer and nozzle E into wash tank (2). The ash-water wash water containing any coal particles which did not floc and overflow into (1B) are removed by line 19 from the bottom section of wash tank (2) and are forced into a fine coal recovery line B-1 through which recovered coal is collected in a series of tanks at coal recovery 15 where fine coal otherwise lost is recovered. The intimately admixed ash-water suspension containing some small amounts of particulate coal is separated in the wash water recovery system by passing it through settling and classifier apparatus and finally through a centrifuge where high ash-low water solids are recovered and expelled for removal from the process. Suspended solids-free wash water is further treated at 20 to control the condition of the recovered water before recycle. The clean treated process water is recycled to produce the original aqueous coal slurry and such other water make-up as the overall process may require when material flow is in balance.

The washed coal flocculate enters the final wash step from (1B). From the in-line mixer 18 the floc-water slurry under pressure passes through shear nozzle F. The water-coal particle admixture is again atomized and collected in wash tank (3). Velocity and high shear through the nozzles D, E, and F allow wash water contact with any ash priorly retained in the interstices of the coal floc, thereby assisting in each wash step to release ash to water removing additional quantities f reactive ash impurity in the coal. The massive water phase created in the wash tanks (1), (2) and (3) floats the flocculated coal-oil-air mass to the top of the series of wash tanks (1), (2) and (3) and overflows the coal floc sequentially into collector tanks (1A), (1B) and (1C). Fine floc overflow from tank (3) into tank (1C) carries the washed floc in an aqueous stream to a mechanical de-watering means through line C.

The beneficiated, grafted, clean coal slurry is thereupon de-watered remarkably completely without requiring thermal energy. Illustrated here is a centrifuge, one advantageous mechanical means for the purpose. Note also, the "dry" recovered coal product at this point in the process requires no thermal evaporation of water due to the reduced attraction for water between the large coal-oil surfaces and the water physically occluded therebetween in the flocculated "dry" coal recovered from the mechanical drying step.

The dry hydrophobic cleaned coal can be used advantageously at this point as a higher energy content-sulfur reduced fuel which may be referred to as Product I. This fuel can be utilized in direct firing.

However, the principal practical purpose of this invention is to provide a liquid fuel which is easily pumped as a liquid, but which is of such rheological quality as to form a thixotropic liquid. A thixotropic liquid is one that has "structure" or tends to become viscous and gel-like upon standing quiescent but which loses viscosity and the "structure" or gel decreases markedly and rapidly upon subjecting the thixotropic liquid to shearing stresses, as by agitation through mixing and pumping processes or by heating above the "drop point".

In the preferred practice of this invention the dry, beneficiated, coal Product I coming from the conveyor, following mechanical water removal, is mixed with a quantity of fuel oil (illustratively 1:1 by weight), preferably heated to reduce viscosity in cases where the fuel oil is of a heavy viscosity grade, in pre-mix tanks to again provide a pumpable fluid mixture.

A preferred, but alternative practice, is to subject the fuel-oil-coal mixture in the pre-mix tanks to an additional graft polymerization step, following the general reaction procedure as in the first graft polymerization. In this case the $RC{=}^{O}$—OH acids are employed, as illustrated by tall oil fatty acids, oleic acid, etc. However, in an alternative modification of the process, it is permissible and operative to employ an $RC{=}^{O}$—OH acid which is saturated (if there is no desire to create a second reactive, grafting procedure). In this latter election, peroxide and metal ion initiator need not be incorporated with the added saturated or unsaturated fatty acid addition. Naphthenic acids are illustrative.

The non-fluid admixture of polymer surface grafted coal, fuel oil and $RC{=}^{O}$—OH acid is substantially neutralized with a water soluble alkali metal and the fluidized particulate containing fuel oil-coal is pumped through an in-line mixer. Alkaline earth metal ions from, for example, a calcium hydroxide solution are incorporated in the stream in an amount to react, at least in part, by double decomposition reactions fo form the alkaline earth metal soaps or salts of the acid moiety previously neutralized with the alkali metal. Other metal ions may also be selected at this point to modify the "drop point" of the final Product II, liquified coal-oil mixture (C.O.M.).

The fluid coal-oil mass is then subjected to further high shear processing in a high shear milling device, such as is used in dispersing pigments in oils to product paint products.

A liquid clean coal-oil-fuel mixture, having no tendency to settle out, is storably recovered to provide a flowable high energy source for a wide variety of end uses.

Table I is of interest in illustrating some data concerning products of this invention.

TABLE I

| PROCESS COMPARISONS WITH PRESENT ECONOMICS | | | |
|---|---|---|---|
| Material | BTU/# | $/MBTU | $/Ton |
| (1) #2 Fuel oil | 19.5 K | 4.77 | 186.00 |
| (2) Crude oil* | 15.7 K | 4.40 | 138.00 |
| (3) #6 Fuel oil | 17.0 K | 3.65 | 124.00 |
| (4) Coal ROM | 10.5 | .95 | 20.00 |
| (5) Coal (Deliberate Ben) | 12.5 | 1.60 | 40.00 |
| (6) Coal (Elaborate Ben) | 13.5 | 2.59 | 70.00 |
| (7) Product of Invention | 13.5 | 1.38 | 37.38 |
| (8) 7 + #2 Fuel oil | 16.5 | 2.85 | 94.00 |
| (9) 7 + #6 Fuel oil | 15.0 | 2.53 | 76.00 |

*Crude calculated at $20.00 barrel.

The following Examples are further illustrative of the invention.

EXAMPLE I 2000 g, Illinois #6 coal having 5.35% ash content reduced to about ¼" size lumps was reduced in particle size to between about 48 to 200 mesh in a hydro crusher roll grinding unit in a aqueous liquid slurry where the liquid phase is about 5% of total as fuel oil and about 65% water. The coal solids are about 30% of the total fluid slurry.

A chemical graft polymerization mixture consisting of 500 mg. tall oil, 100 g of fuel oil, 2½g sodium pyrophosphate and 1 g of copper nitrate were incorporated into the above mill batch in the initial mill loading. Before the mill was discharged 1½g of $H_2O_2$ in Solution (30% $H_2O_2$ in water) was incorporated and graft polymerization of polymer on the coal surface was completed. The aqueous slurry was removed shortly thereafter from the mill, transferred to a settling vessel and the hydrophobic grafted coal was recovered by removing it from the surface of the water phase on which it floated. The water phase contained the hydrophobic ash which was discarded. Water used was between 30° and 40° C. for all processing steps.

After several re-dispersions and recoveries in and from fresh softened wash water the agglomerated grafted coal was recovered. After filtering on a Buchner funnel the water content was about 15%. Coal normally processed without the grafting step will retain from 20–50% water when ground to the same mesh size. Washing can be effective at as low as 20° C. but it is preferred to use at least 30° C. water temperature. The water preferably contains a phosphate conditioning agent.

The recovered, mechanically dried cleaned treated coal aggregate was admixed with oil and an additional 60 gm of tall oil. After thorough intermixing, caustic soda equivalent to the acid value of the mix was reacted with the free carboxyl groups of the tall oil.

After standing for several months no settling of the coal-liquid fuel mixture was observed.

EXAMPLE II

A series of runs were made similar to the detail of Example I, but substituting gram equivalent amounts of a series of polymerizable monomers for the tall oil (acids) as follows: (a) Styrene monomer, (b) methyl methacrylate, (c) methacrylic acid, (d) oleic acid, (e) dicyclopentadiene, (f) dodecyl methacrylate, (g) octadiene 1,7, (h) 2,2,4trimethyl pentene-1, (i) glycidyl methacrylate and (j) soyabean oil fatty acids. Chemical grafting of the surface of the pulverized, treated coal was similarly altered to the strongly hydrophobic nature and processed similarly to Example I. In each case the same amount of tall oil (acids) was admixed in the recovered coal aggregate after de-watering. Acidity was neutralized with caustic and similar liquid fuel suspensions were prepared. All exhibited thixotropic qulity depending upon the metal ion selected to displace the sodium ion of the alkali metal hydroxide originally added. No settling was observed over several weeks study independent of the polymerizable monomer selected.

EXAMPLE III

As in Example I, except 2 grams of butyl peroxide were used in the graft polymerization step in place of $H_2O_2$. The water was treated with 2 grams of Triton X-100 and 25 g of sodium pyrophosphate present in the originally slurry water. The ash in the water phase was filtered out after treating with lime. The ash content was reduced from about 4.28% to about 1.9% after five separate washings where the water was also treated with the same conditioning agents. The tall oil (acids) used in the graft polymerization plus the tall oil added after processing were neutralized, first with caustic soda, and later treated with an equivalent amount of a water soluble alkaline earth metal, (calcium hydroxide). The recovered mechanically dried clean coal-oil product was further reduced with fuel oil to a flowable viscosity. The viscosity quality, or rheology, of the system indicated it was of thixotropic gel-like nature, indicating no settling was to be expected upon standing.

EXAMPLE IV

In the initial work, it was considered probably advantageous to incorporate the chemical grafting components comprising the $RC{=}^{O}$—OH unsaturated monomer acids (tall oil), the metal ion initiator catalyst, which initiates the free radical formation from the peroxide, and the peroxide free radical polymerization catalyst before the coal had been reduced to the −48 mesh size by fine grinding techniques.

A study of the addition times indicated more favorable ash removal and coal recovery by first reducing the coal to less than about 48 micron size in conditioned water aqueous slurry. Thereafter, one incorporates the metal initiator for the free radical peroxide catalyst, fuel oil, and the water insoluble polymerizable monomer. The free radical catalyst is withheld until just after completion of the grinding steps and before recovery for the washing steps. Up to this time the actual graft of polymerization of the monomer is delayed.

The following illustrates the best mode and practice presently known.

The coal is reduced to 200 mesh (more or less) in a conditioned water (sodium tetraphyrophosphate) slurry. 2000 grams of coal are in the mill. To the mill contents are added ½ gram tall oil acids, 100 grams fuel oil and 1 gram of metal initiator (Cu as copper nitrate). The batch is held at 30° C. Just as the milling is to be discontinued, there is added 1.64 grams of $H_2O_2$. The mill contents are pumped by a high shear centrifugal pump into a receiving vessel equipped with a high speed agitator. The coal-water slurry is maintained in dispersed state in the receiving vessel for about ten minutes and is then pumped at high pressures through a fine spray nozzle where high shearing stresses atomize the slurry into fine droplets. The air atomized droplets are directed onto and into the surface of a conditioned wash water containing vessel where the ash separates into the water and the now aerated coal particles rise and float on the surface and are recovered and vacuum filtered or centrifuged. Initial ash content was 4.45% and the ash content of the treated clean coal product was 1.50%. It was also found that 1905 g clean coal was recovered or in excess of about 95% coal recovery.

DEVELOPMENT OF THE INVENTION

Monomers priorly used in chemical grafting and polymerization procedures in the main require pressure as they are gaseous. However, for the purposes of this invention where total economics of the process are extremely critical only monomers that are liquid at room temperature are used. Additionally, some of the prior art monomers are capable of producing a hydrophobic surface on the high surface areas of the pulverized coal, but are not as oilophilic in character as others. For the purposes of this invention and in the chemical grafting and polymerization step methyl and ethyl methacrylate, methyl and ethyl acrylate, acrylonitrile, vinylacetate, and styrene are useful as illustrative.

In the chemical grafting step, one may successfully use an unsaturated monomer which is a liquid at room temperatures and not having the polar carboxyl radical. Examples of monomers found effective in chemical grafting of coal include: styrene, cracker gasoline, dicyclopentadiene, coker gasoline, polymer gasoline all of which are available from various refinery processes.

It is our preferred practice, however, and from our research, it is preferred to use an unsaturated water insoluble monomeric organic acid having the general structure RC=$^{O}$—OH where R is unsaturated and has at least about 8 carbon atoms in the hydrocarbon moiety. Economically attractive and extremely efficient is tall oil, a well known by-product in paper manufacture which is available in various grades of purity. One grade is generally in excess of 95% oleic acid, most of the remainder being rosin acids. All of the unsaturated fatty acids available from vegetable seed oils, illustratively soyabean oil, fatty acids are useful. Dehydrated castor oil fatty acids are relatively expensive, but are useful.

After the chemical grafting step has been completed and usually after all water-washing, additional RC=$^{O}$—OH is advantageous. All of the above illustrated class of unsaturated long chain organic acids can be used. In the secondary use, if a second graft polymerization is not elected, it is also feasible to expand the class of useful organic RC=$^{O}$—OH acids to include those where R is saturated and this class is especially opened to include both highly refined napthenic acid as well as a variety of fairly unique sources of napthenic acid, illustratively Venezuelan crudes and certain bunker fuels known to contain many napthenic acid fractions, Rosin acids are also useful.

Napthenic acid may also be reactive through a resonance phenomona and be substantially equivalent in reactivity to the unsaturated RC=$^{O}$—OH acids in the grafting step. While initial trials indicate some reactivity despite the fact that napthenic acids are saturated, these latter acids have not yet been established as fully useful for the chemical grafting step.

The reactive metal ion site catalyst initiator salts of the prior art disclosed by U.S. Pat. Nos. 4,033,852 and 3,376,168 to Horowitz mention as useful, namely: silver nitrate, silver perchlorate, silver acetate and other noble metal ions include platinum and gold. Nickel and copper have also been mentioned as useful in initiating, free radical development from the peroxide catalyst to thus stimulate grafting of reactive polymerizable monomers to the backboned of preformed polymers. These metal initiator ions are used in the form of their water soluble salts.

We prefer to use the copper ion as the best mode presently known in our process. However, very preliminary evidence indicates that a rather larger number of other known catalytically active metals may be operative for the ends of the present invention. Of possible value are Fe, Zn, As, Sb, Sn and Cd, though not limiting by their mention. Thus, the term metal ion catalyst initiator tentatively includes all the catalytically active metal salts which can be used to provide polymerizably active metal ion sites on the pulverized coal surfaces.

Process water used is preferably between 30° and 40° C. If the temperature exceeds this generally optimum range it has been observed while there is no coal loss, ash removal drops off. If the temperature is below this range, not only does ash removal become less complete, but coal recovery drops off in the process. Washing can be carried out at lower temperatures but at about 30° overall improvement has been noted. Coal recovery of about 95% has been obtained with water content by vacuum filtration reduced to about 12% by weight. Water conditioning has been found useful.

Soxhlet extraction of our chemically grafted coal indicates very little free oil is removed (excluding the fuel oil process additions). The acid value of the Product I coal was found substantially equivalent to the RC=$^{O}$—OH acid used both in the grafting step or steps and the later RC=—OH additions, whether saturated or unsaturated in the R group.

In early work the chemical grafting step was activated by use of organic peroxides normally used in the art of free radical polymerization reactions. However, it was found that hydrogen peroxide was a provident substitute therefor, introducing economy of operation. Higher efficiency of coal recovery has been noted where $H_2O_2$ is used.

In the graft monomer polymerization addition step, use of fuel oil of the order of 5% in the catalyst carrier appears to function to provide better coal recovery and is about optimum. More or less than 5% is not operationally critical.

Conditioning of the water will vary with the water source as is well know. Zeolite water treatment may be advantageous in some instances. Other methods of water conditioning is a specialized art, and may provide advantages over and beyond mere treatment with the known phosphate additives, illustratively tetra sodium pyrophosphate. Minor additive of organic surfactants of the anionic, non-ionic and cationic classes may be valuable additions in some instances. Again, economics of their use weighed against advantages in ash removal and coal recovery may be quite specific to the coal being treated and the source of process water.

As the process water can be recovered recycled from ash settling reservoirs, a large part of the initial water costs can be reduced.

Coal recovery may be improved by a two stage addition of the chemical grafting additives. In other words, two complete and separate graft polymerization reaction mixture additions and reactions may be carried out on the fine particle coal during the processing, if desired. Early work has indicated advantage. Ash reduction of the order of 66% (1.5% residual ash in coal products) has been recovered in some of the trial runs.

The total amount of chemical grafting additives shown in the Examples is satisfactory and operative. Undoubtedly modifications both in ratio of reactants as well as their ratio to the weight of coal being processed can be operationally varied within a wide range. The limiting factors will, of course, be modified by the economics of established commercial plant experience.

In the coal slurry prepared for coal size reduction, the percentages of coal and water will be variable, again depending on pulverizing methods used as well as sources of coal and water. These ratios can be readily determined for a given set of conditions by one skilled in the coal-grinding arts.

An unexpected advantage has been found in the relatively small water content of the recovered oil treated-grafted coal flocculate, and the relative ease of removal of water by purely mechanical means, e.g., centrifuge, pressure filtration, etc., which are adapted to continuous processing. No thermal energy is required for water removal and drying. Again, the advantages of the disclosed process are reflected in the relatively small capital expenditure (estimated ⅗ of the prior art coal beneficiation plants) for plant and plant operation expenses.

Fuel oil used for production of fluidized coal is possible with all grades of fuel oil, even including #6 fuel oil, which is of extremely variable composition.

The fact that it is usual in coal mining operations that coal milled to 28 mesh leaves behind about 40% of the original coal in a finer mesh size, and not presently of saleable use, provides an opportunity for practical use of these mine tailings. Coal freeze-up in below-freezing weather will not occur with the dried solid coal Product I or II as disclosed, both because there will not be water pick-up in storage as well as the "dry" state of the shipment of the product. In the fluidized, thixotropic form (Product II) of the invention, the product can be transferred by pumping.

Coal loss during the washing steps has been of the order of 10%. Experience thus far indicates refinements of the present process will improve (reduce) losses of raw material.

In use of some fuel oils in producing the liquified Product II, it is advantageous to heat the components together in the pre-mixer. Temperatures in the general range of 150°–225° F. have been found useful.

Very little water has been lost in the processing and water lost in the final products is generally replaced by the water inherently in the coal from the prior art processing or inherently present. Product II contains not more than about 6% water and the dry clean coal Product I is generally not more than about 12% water.

Inasmuch as the water is recycled, the only waste product from the process is the centrifuged ash. No thermal energy is used in drying, hence the process is environmentally sound.

Having thus described the invention, the following is claimed:

1. Apparatus for beneficiating coal comprising:

means providing coal reduced to small particles of coal and small particles of ash in an aqueous carrier;

means introducing graft polymerization reactants and oil into said carrier upon discharge from said coal reducing means;

means providing and containing a supply of graft polymerization reactants, means connecting the polymerization reactant supply means to said introducing means, and means for conveying the polymerization agent from said supply means to the introducing means;

a plurality of serially connected wash cells, each having an inlet and an outlet thereto;

aqueous coal carrier conveying means conveying said carrier to a first of said serially connected wash cells;

conduit means for said carrier, connecting and communicating said coal reducing means to said inlet of said first wash cell, and each of subsequent serial wash cell inlets to the previous wash cell outlet, and having separate in line mixing means located in each conduit means, said mixing means mixing said carrier;

said wash cells each having a tank containing a body of wash water having an upper surface, a body of gas above said wash water upper surface, a nozzle at said inlet of each said wash cell atomizing said carrier into fine droplets and propelling said fine droplets through said body of gas against said wash water upper surface, means at said upper surface of said wash water removing said small particles of coal from said wash water and said tank;

means introducing water into said removed small particles of coal after removal from each said cell, except said last serially connected wash cell, and means conveying said small particles of coal and water through said conduits to said next serially connected cell; and, means conveying said coal particles from said last serially connected wash cell to mechanical drying means adapted to extract water from said coal particles collected at said last serially connected wash cell.

2. The apparatus of claim 1 wherein said nozzles are high shear nozzles.

3. The apparatus of claim 1 wherein each said wash cell includes means removing said small particles of ash and portions of said wash water from said tank.

4. The apparatus of claim 1 wherein a high shear mixer receives said water extracted coal particles and mixing said particles with fuel oil and geling agents.

* * * * *